United States Patent
Guillermo

(10) Patent No.: US 7,556,412 B2
(45) Date of Patent: Jul. 7, 2009

(54) FIBER OPTIC AUXILIARY LIGHTING SYSTEM

(75) Inventor: Vernon Guillermo, Farmington Hills, MI (US)

(73) Assignee: INT America, LLC

( * ) Notice: Subject to any disclaimer, the term of this patent is extended or adjusted under 35 U.S.C. 154(b) by 208 days.

(21) Appl. No.: 11/458,702

(22) Filed: Jul. 20, 2006

(65) Prior Publication Data

US 2008/0025039 A1    Jan. 31, 2008

(51) Int. Cl.
*G09F 13/18* (2006.01)
(52) U.S. Cl. .................... 362/556; 362/551; 362/555; 362/558; 362/565; 362/570
(58) Field of Classification Search .............. 362/551, 362/555, 556, 558, 565, 570; 385/115, 119, 385/147
See application file for complete search history.

(56) References Cited

U.S. PATENT DOCUMENTS

| | | | |
|---|---|---|---|
| 5,005,108 A * | 4/1991 | Pristash et al. | 362/602 |
| 5,895,115 A | 4/1999 | Parker et al. | |
| 6,030,089 A * | 2/2000 | Parker et al. | 362/103 |
| 6,036,340 A | 3/2000 | Fohl et al. | |
| 6,102,559 A | 8/2000 | Nold et al. | |
| 6,244,734 B1 | 6/2001 | Hulse | |
| 6,250,785 B1 | 6/2001 | Mallia et al. | |
| 6,439,751 B1 | 8/2002 | Jones et al. | |
| 6,565,244 B1 | 5/2003 | Murphy et al. | |
| 6,854,869 B1 | 2/2005 | Fernandez | |
| 2002/0071267 A1 | 6/2002 | Lekson et al. | |
| 2002/0136017 A1 | 9/2002 | Tufte | |
| 2003/0156429 A1 * | 8/2003 | MacDonald | 362/570 |
| 2003/0189836 A1 | 10/2003 | Sparling et al. | |
| 2003/0206417 A1 * | 11/2003 | Pastrick et al. | 362/494 |
| 2004/0027837 A1 | 2/2004 | Hsu | |

* cited by examiner

*Primary Examiner*—Sandra L. O'Shea
*Assistant Examiner*—Meghan K. Dunwiddie
(74) *Attorney, Agent, or Firm*—Gifford, Krass, Sprinkle, Anderson & Citkowski, P.C.

(57) ABSTRACT

A lighting device is provided that includes a housing containing a light emitting portion of a light emitting diode and a terminus of a fiber optic bundle such that light emission from the light emitting diode is communicated along the optical fibers. The fiber optic bundle has a flattened distal portion with a cross-sectional array of layers of optical fibers. A diffusing layer is attached to the fiber optic bundle overlying the flattened distal portion. The lighting device, upon being overlaid with a graphic and surrounded by a frame through which the graphic is visible, provides a vehicle lighting assembly securable to a vehicle substrate. The vehicle light assembly is particularly well suited for vehicle exterior badging, kick plates and vanity lighting within the vehicle passenger compartment.

27 Claims, 8 Drawing Sheets

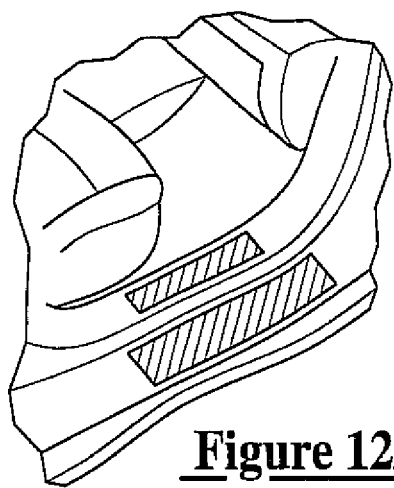
Figure 12A
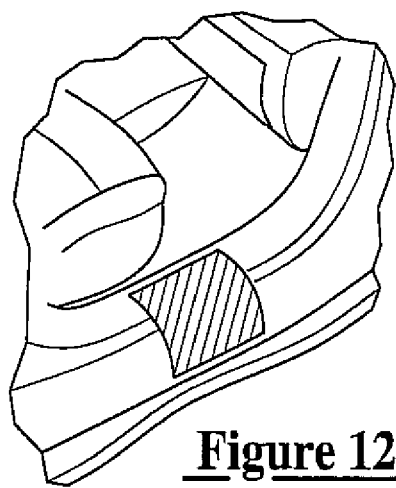
Figure 12B
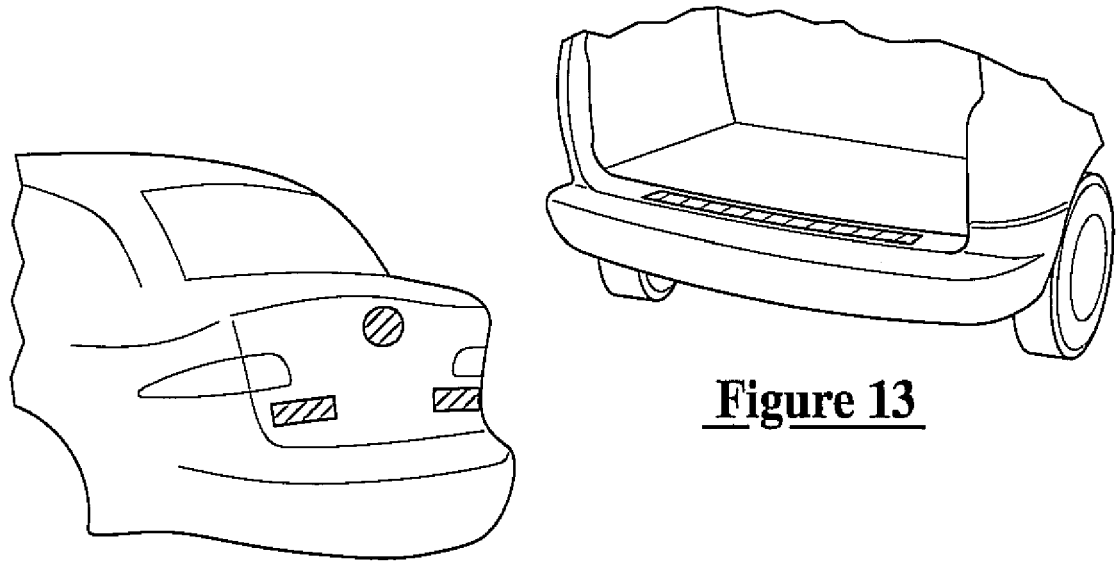
Figure 13
Figure 14
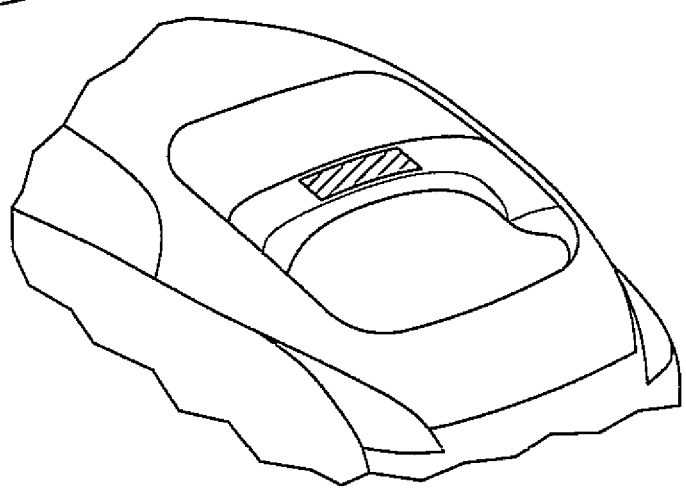
Figure 15

FIBER OPTIC AUXILIARY LIGHTING SYSTEM

FIELD OF THE INVENTION

The present invention in general relates to diffuse backlighting via a fiber optic bundle, and in particular to transmission of light emitting diode emission via fiber optics in the context of backlighting of vehicle plates.

BACKGROUND OF THE INVENTION

Low intensity lighting installations provide enhanced safety and decorative properties to a vehicle body or driver helmet. Low intensity vehicle body lighting was largely impractical with incandescent bulbs owing to problems associated with high vertical profiles and heat management. More recently, other approaches to backlighting vehicle body features have invoked direct lighting with a light emitting diode. U.S. Pat. No. 6,244,734 is representative of such efforts. However, such efforts have met with limited acceptance owing to intensity variation along the length of a feature such as a vehicle door kick plate. Intensity variations have been in part compensated for by a linear array of light emitting diodes or the use of a distant light emitting diode having light emission transmitted from beneath a lighted feature with a light pipe. U.S. Pat. No. 6,036,340 and U.S. Patent Application Publication 2002/0017267 A1 are representative of such efforts.

A remote light emitting diode has previously been coupled to the terminus of a fiber optic bundle to provide lit piping within a vehicle interior. U.S. Pat. No. 6,854,869 is representative of such systems. Unfortunately, the fiber optic bundle outer layers obscure emission from fiber optics within the interior of the bundle and as a result provide insufficient intensity to backlight a transparent or translucent overlay positioned parallel to the fiber optic bundle.

Still other attempts to provide vehicle exterior low intensity backlighting have included resort to electroluminescent sheeting deployed directly beneath the feature. Electroluminescent backlighting in a vehicle context has been limited to a narrow range of applications perceived to be of high value owing to the stringent electrical input requirements, material costs and susceptibility to environmental degradation. U.S. Pat. No. 5,641,221 is representative of vehicle electroluminescent backlighting.

Thus, there exists a need for a vehicle exterior backlighting system that achieves a high degree of illumination uniformity across a feature so as to overcome the limitations of the prior art.

SUMMARY OF THE INVENTION

A lighting device is provided that includes a housing containing a light emitting portion of a light emitting diode and a terminus of a fiber optic bundle such that light emission from the light emitting diode is communicated along the optical fibers. The fiber optic bundle has a flattened distal portion with a cross-sectional array of layers of optical fibers. A diffusing layer is attached to the fiber optic bundle overlying the flattened distal portion. The lighting device, upon being overlaid with a graphic and surrounded by a frame through which the graphic is visible, provides a vehicle lighting assembly securable to a vehicle substrate. The vehicle light assembly is particularly well suited for vehicle exterior badging, kick plates and vanity lighting within the vehicle passenger compartment.

BRIEF DESCRIPTION OF THE DRAWINGS

FIGS. 12A and 12B depict in the hash-marked regions an inventive device provided in the context of (12A) a vehicle running board and vehicle kick plate, and (12B) a door frame base spanning version thereof;

FIG. 13 depicts in the hash-marked region an inventive device provided in the context of a vehicle tailgate plate;

FIG. 14 depicts in the hash-marked region an inventive device provided in the context of a vehicle trunk running light insignia;

FIG. 15 depicts in the hash-marked region an inventive device provided in the context of a vehicle roll bar running light insignia;

DETAILED DESCRIPTION OF THE PREFERRED EMBODIMENTS

The present invention has utility as a backlit lighting system. The dimensional and performance properties of an inventive lighting device are particularly well suited for vehicle passenger compartment and vehicle exterior trim illumination. The high optical uniformity of the light flux emitted orthogonal to a fiber axis is achieved by flattening a fiber optic bundle receiving light from a light emitting diode by flattening the fiber optic bundle. Insertion of a diffusion coating intermediate between a fiber optic bundle and a viewing vantage point affords still more uniform optical flux gradients across a flattened portion of an optical fiber bundle receiving light emission from the light emitting diode proximal to a terminus of the fiber optic bundle. Light emission uniformity from the flattened bundle is enhanced by placing a diffusion layer intermediate between the fiber optic bundle and the direction of viewing. A backing layer is optionally applied to the rearmost surface of the rectilinear portion of the fiber optic bundle relative to the direction of viewing. A transparent sheath is optionally provided to envelope at least the flattened portion of the fiber optic bundle to provide an added degree of protection from the environment or otherwise stabilize the structure. The low vertical profile of the rectilinear portion of a fiber optic bundle is well suited for placement underlying a transparent or translucent structure such as those found within a passenger compartment or a vehicle exterior.

Figure 1A:
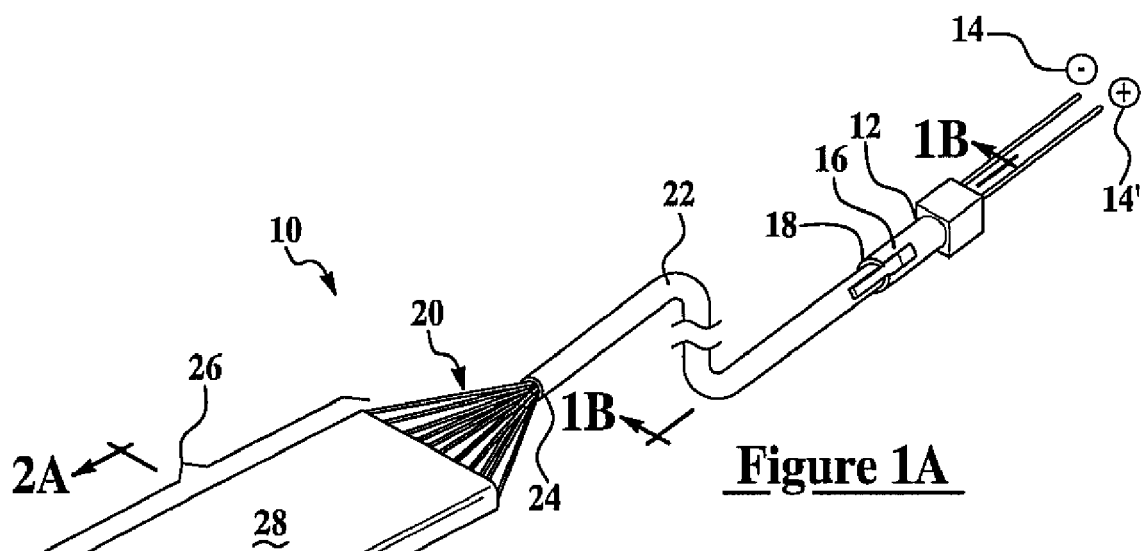
FIG. 1A is a perspective view of an inventive diffused lighting device.
Figure 1B:
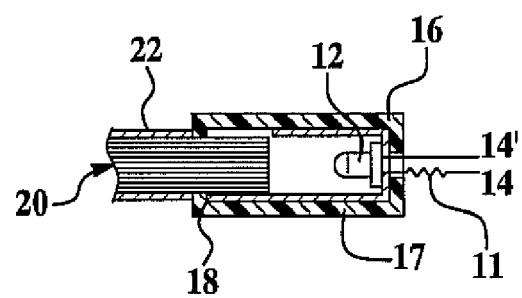
FIG. 1B is a longitudinal cross-sectional view of the device of FIG. 1A along line 1B-1B.

Referring now to FIGS. 1 and 2, an inventive lighting device is depicted generally at 10. The lighting device 10 includes a light emitting diode (LED) having electrical leads 14 and 14' extending therefrom. A resistor 11 intermediate between an LED 12 and power leads 14 and 14' serves to modify input voltage to the light emitting diode 12. It is appreciated that the LED 12 is chosen to provide any number of output wavelengths from the visible and ultraviolet electromagnetic radiation spectrum. Additionally, LEDs are readily modulated to provide lighting effects such as color-changing effects or pulsed light emissions. A housing 16 encompasses the light emitting element of the LED 12 and an end 18 of fiber optic bundle 20. The end 18 is positioned relative to the LED 12 so as to receive light emission from the LED 12 and direct light along the length of the fibers making up the fiber optic bundle 20. The housing 16 is readily formed in a variety of forms to satisfy the functional requirement of retaining the end of a fiber optic bundle and a light emitting diode in a preselected positional relationship. A housing 16 formed from an injection molded thermoplastic is formed to have in one embodiment a flexible seam extending the length of the housing 16 with complementary fastener portions along the open edge of the housing such that closure along the seam 22 brings complementary fastener portions 24 and 24' into a closed relationship forming the collar-like housing 16. Alternatively, the housing 16 receives by friction fit or pressure adhesive the end 18 of the fiber optic bundle 20, and in a similar fashion secures LED 12. The housing 16 optionally includes a reflective coating 17 therein to reflect more emission from the LED 12 into the end 18, as shown in FIG. 1B. Optionally, the fiber optic bundle 20 proximal to the housing 16 is retained within a wrapping 22. The wrapping 22 illustratively includes heat shrink tubing, an adhesive tape, and a fiber or fabric lashing thereabout. Fiber optic bundle 20 extending from an end 24 of an optional wrapping 22 has a distal flattened portion 26 having a defined width. In a distal portion 26 the fiber optic bundle 20 is flattened to form flattened layers of fibers. In the simplest embodiment, the fibers making up the fiber optic bundle 20 are flattened to form a single layer of fibers. Preferably, the fibers are contiguous and parallel. A benefit of a flattened array of fibers is that light emission from a fiber extending orthogonal to the fiber axis is not scattered or otherwise dissipated by intermediate fibers intermediate between the rearmost light emitting fiber and a viewing position. However, in some instances where higher illumination flux is desired, it is appreciated that a single flattened layer of fibers affords insufficient incidental light emission and in such instances a flattened distal portion 26 includes from two to eight layers of fibers flattened into an array. The array need not be rectilinear as depicted in the figures and instead can assume a concave, convex, periodic, or other cross-sectionally varying form. More preferably, in such instances two to four vertically displaced contiguous layers are provided as a compromise between emission and adjacent layer diffusional losses. It is appreciated the length of fiber optic bundle 20 between the proximal end 16 and the distal terminus 29 of the fiber optic bundle is virtually unlimited since illumination losses along the length of the fiber optic are approximately 1% illumination loss per meter of fiber. The device 10 typically has a flattened distal portion with a width up to about 5 centimeters and a length of up to 40 centimeters. Preferably, the total area illuminated by each LED is less than or equal to 200 square centimeters.

Figure 2A:
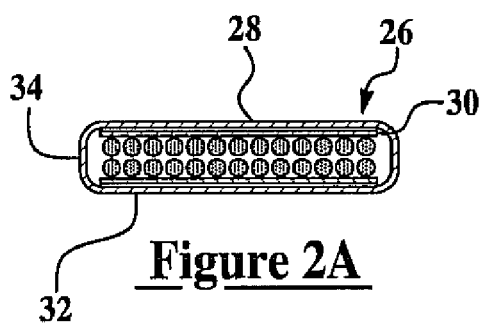
FIG. 2A is a transverse cross-sectional view of the device of FIG. 1A along the line 2A-2A.

FIG. 2A depicts a two-layer fiber optic array. The typical thickness of flattened distal portion 26 is between 0.3 and 3 millimeters. Optionally, a reflector 31 is provided to reflect light back down the length of the fiber optic bundle 20. A suitable reflector 31 is formed from a metal foil or laminate of metal foil with polymers such as MYLAR®. In order to lessen light flux gradients perceived through the viewing side 28, a diffusing layer 30 is applied between the distal portion 26 and the viewer. A diffusion layer is readily formed from translucent substances illustratively including thermoplastics, thermosets, colloidal particulate and frosted glass. In instances where bidirectional light emission is desired, it is appreciated that reflector layer 32 is readily replaced with another layer of diffusing layer 30 denoted in FIG. 2B at 30'. Such bidirectional emission is contemplated in, for example, vehicle applications such as window treatments.

Optionally, a reflector layer 32 is provided in opposition to diffusing layer 30. Materials suitable for the formation of a reflector layer are those contemplated above with respect to reflector 31. With the inclusion of reflector layer 32, the majority of light emission from the flattened distal portion 26 of the fiber optic bundle 20 is emitted through the viewing surface 28 and lacks the intensity striations associated with the dimensionality of the fibers owing to the diffusional properties of diffusing layer 30. Optionally, flattened distal portion 26 and layers 30 and 32 are encompassed within a sheath 34. The sheath 34 is illustratively formed from a transparent thermoplastic, a transparent latex, varnish or other hardening polymer with the only limitation being that the sheath 34 is transmissive of light emitted through the fiber optics and provides a measure of protection against debris accumulation and environmental degradation.

Figure 2B:
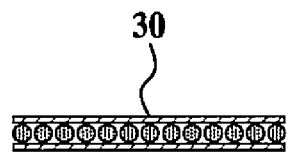
FIG. 2B is a transverse cross-sectional view of an alternate structure of an inventive diffused lighting device.
Figure 2C:
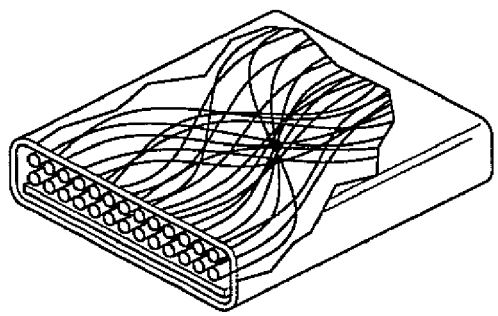
FIG. 2C is a perspective view of a braided array extending from line 2A-2A.

As shown in FIG. 2C, the flattened distal portion 26 can take several forms such as parallel, braided or woven fibers. The advantage of woven and braided fiber arrays is a measure of structural support and uniformity at the expense of nominal light scattering losses relative to parallel fibers.

Figure 3:
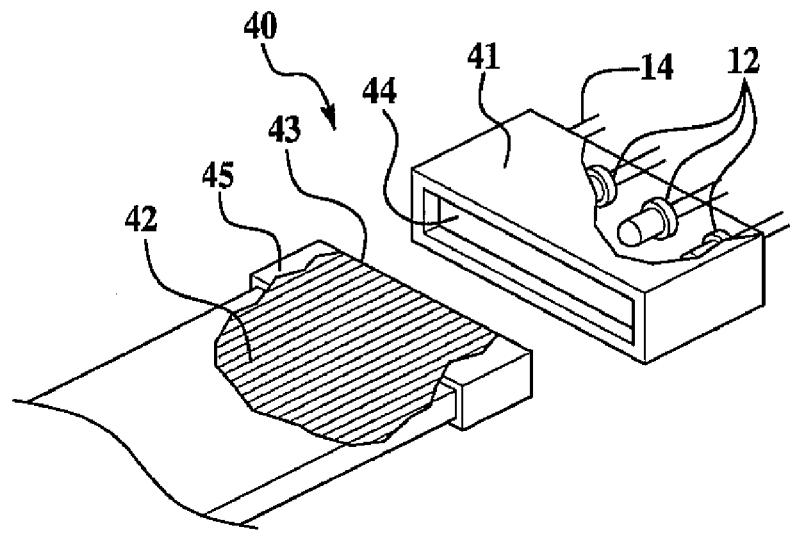
FIG. 3 is an exploded view of a multiple light emitting diode (LED) housing and a fiber optical array.

A multiple LED embodiment is shown in FIG. 3 generally at 40, where like numerals correspond to those detailed above with respect to the preceding figures. Multiple LEDs 12 are mounted in an elongated housing 41. A fiber optic bundle 42 has an end retainer 45 inserted into an opening 44 of the housing 41 such that light emission from the LEDs 12 enters the end 43 and is transmitted therealong. Preferably, the bundle 42 is flattened to between one and eight layers of fiber at or proximal to end 43. The embodiment of FIG. 3 is particularly well suited for illuminating a surface area larger than that illuminated to a satisfactory flux by a single LED. A diffusing layer 30 and other layers are shown and described with reference to FIGS. 2A and 2B are also provided.

It is appreciated that an inventive lighting device is coupled to a vehicle electrical system in a variety of ways to provide illumination in various circumstances. Such circumstances include in addition to opening a vehicle door, hatchback, or energizing a particular lighting circuit such as a dome light, headlight or taillight include braking, exceeding a speed limit or in synchronicity with an audio presentation associated with the sound system.

Figure 4:
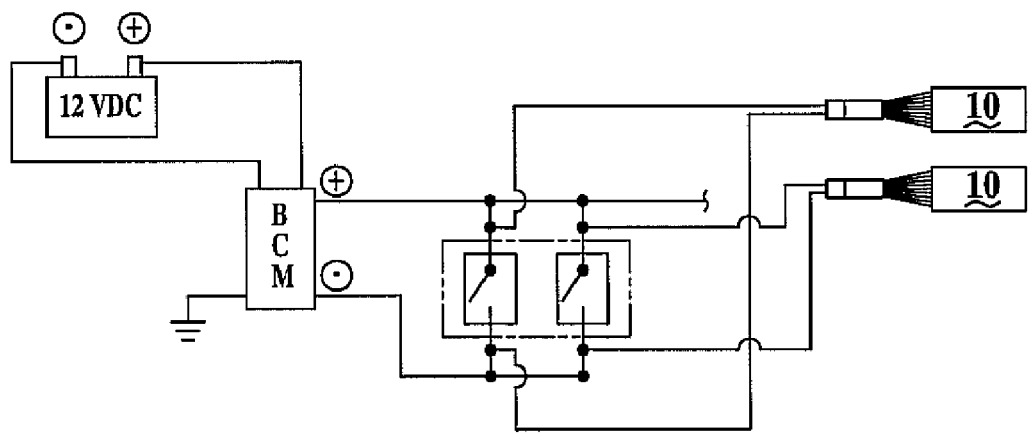
FIG. 4 is an electrical wiring schematic depicting the wiring of an inventive device to a vehicle electrical system containing a bus control module (BCM)

Referring now to FIG. 4, an inventive lighting device 10 is shown being connected in relation to a vehicle electrical circuit where the dashed box includes electrical switches associated with the front driver and passenger door lamp circuits. A conventional bus computer module (BCM) is intermediate between the circuit and a 12-volt direct current battery associated with the vehicle electrical system. In the schematic depicted in FIG. 4, the opening of the doors associated with switches depicted in FIG. 4 causes illumination of the associated inventive lighting device.

Figure 5:
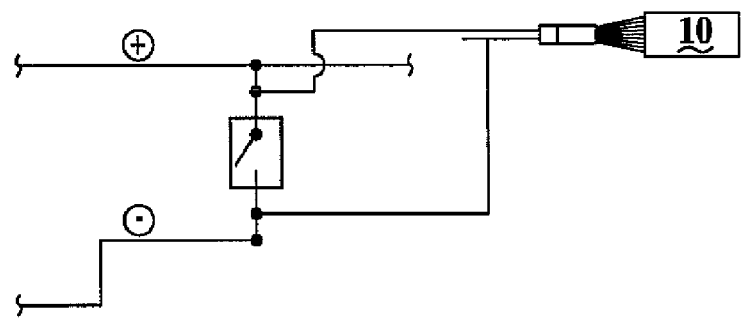
FIG. 5 is an electrical schematic depicting the relationship of an inventive device to a simplified power and activation switching circuit.

Referring now to FIG. 5, an inventive lighting device 10 is depicted in a typical electrical circuit associated with vehicles such as a motor vehicle tailgate or exterior badging, a motorcycle, or a boat. The central switch depicted in FIG. 5 is for example a tailgate electrical switch, headlamp switch, tail lamp switch or the like. Upon closing of the switch, the inventive device 10 is illuminated.

Figure 6:
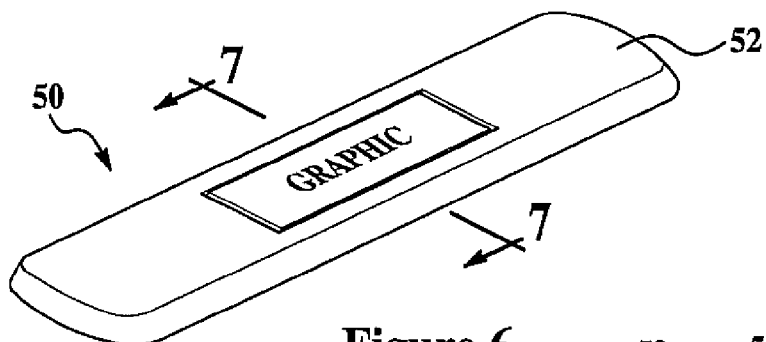
FIG. 6 is a perspective view of a vehicle running board embodiment of the present invention.
Figure 7:
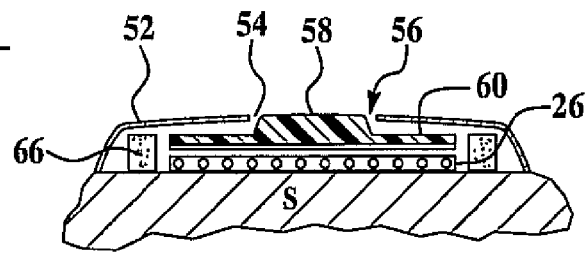
FIG. 7 is a transverse cross-sectional view of the running board inventive embodiment depicted in FIG. 6 transected along the line 6-6.
Figure 8:
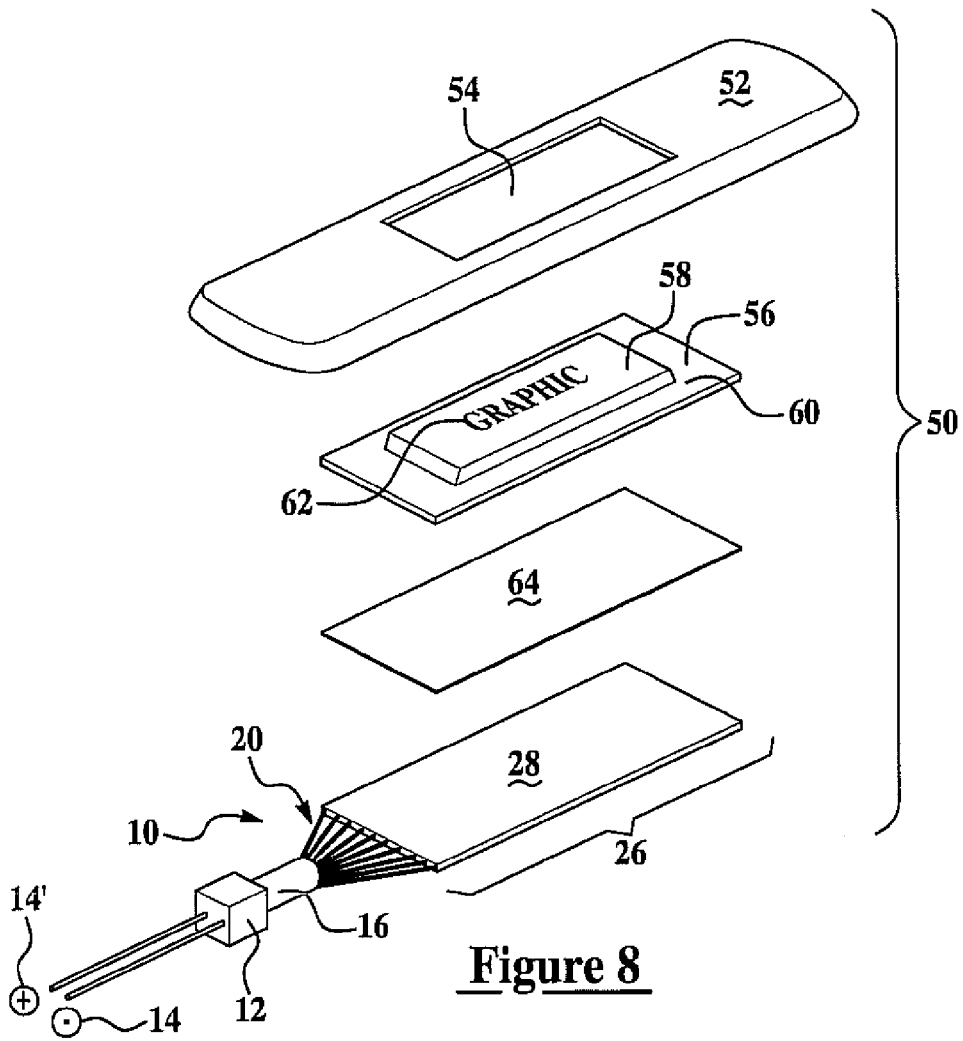
FIG. 8 is an exploded view of the running board inventive embodiment depicted in FIG. 6.

Referring now to FIGS. 6-8 where like numerals correspond to those recently discussed with respect to FIGS. 1 and 2, an inventive vehicle light assembly is depicted generally at 50. However, the fiber optic bundle flattened portion 36 is depicted as a single row for visual clarity. The light assembly 50 is particularly well suited for the formation of a vehicle kick plate or exterior badge. A metal sill plate or badge 52 is provided that defines the bounds of an aperture 54. Optionally, a transparent or translucent plastic insert 56 is formed with an elevated region 58 adapted to engage the aperture 54 and placed in overlying position to surface 28 of device 10 or 40. The raised region 58 is formed of a transparent or translucent plastic material. Impact-resistant thermoplastics such as transparent grades of polyacrylics and polycarbonates are particularly well suited for this application. Preferably, the raised region 58, when present, is colorless. More preferably, the raised region 58 and a pedestal region 60 of the blank 56 have like optical transmission properties. A graphic 62 is optionally applied in alignment with the raised region 58 to provide different light transmissive regions within a raised region 58. The graphic 62 is applied by conventional means including the use of a stencil, an applique, or fusion of a colored plastic piece to the insert 56. Preferably, the graphic 62 is applied to the rearmost surface of the raised region 58 to protect the graphic 62 from abrasion and environmental exposure. A graphic 62 is readily formed with conventional visible light spectrum pigments and dyes, the pigments or dyes fluorescing under illumination provided by an inventive lighting device 10 or 40.

Optionally, the pigmented or dyed film 64 is inserted intermediate between insert 56 and the viewing surface 28 of the inventive lighting device 10 or 40. The components of the vehicle light assembly 50 are secured to a vehicle substrate S and the leads 14 and 14' are coupled to an electrical power source, as for example depicted in FIG. 4 or 5.

The components of vehicle light assembly 50 are held in place with a variety of conventional securement techniques. As depicted in FIG. 7, a double-sided adhesive foam tape 66 is provided to bind lighting device 10, optional film 64 and insert 56. The tape 66 simultaneously engages the plate 52 and the substrate S to form a completed assembly.

Figure 9:
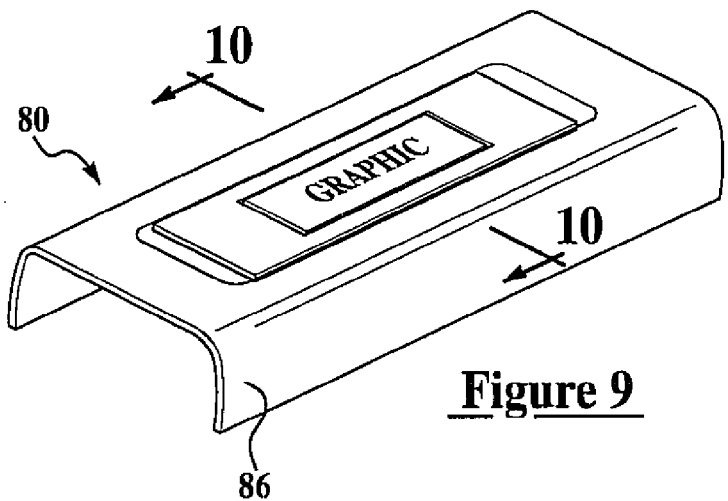
FIG. 9 is a perspective view of a vehicle running board embodiment of the present invention.
Figure 10:
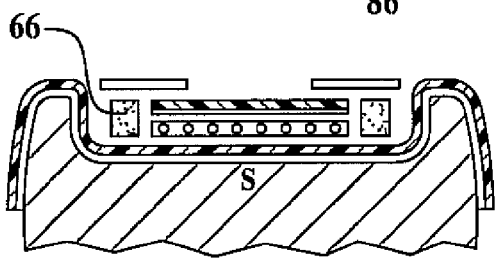
FIG. 10 is a transverse cross-sectional view of the running board inventive embodiment depicted in FIG. 6 transected along the line 6-6.
Figure 11:
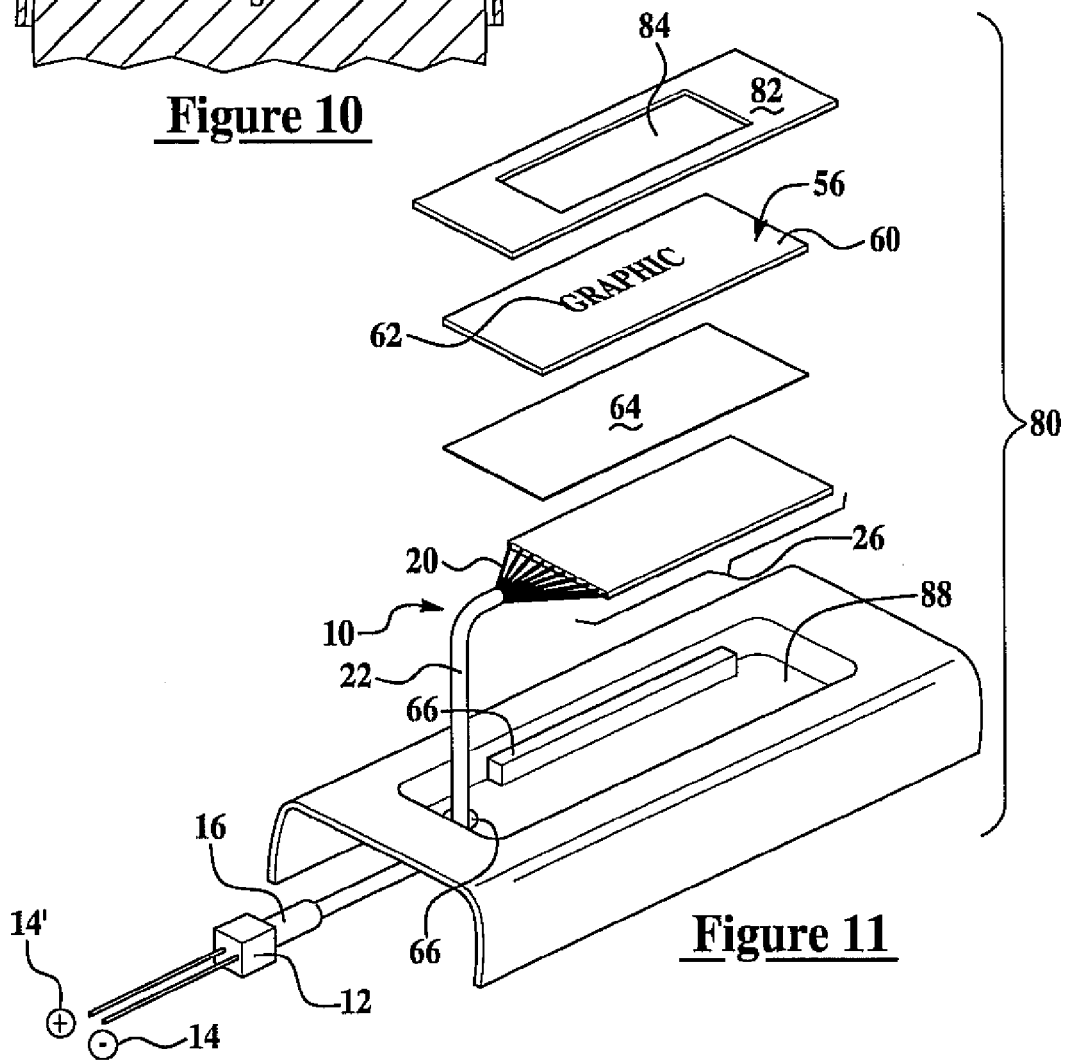
FIG. 11 is an exploded view of the running board inventive embodiment depicted in FIG. 6.
Figure 16:
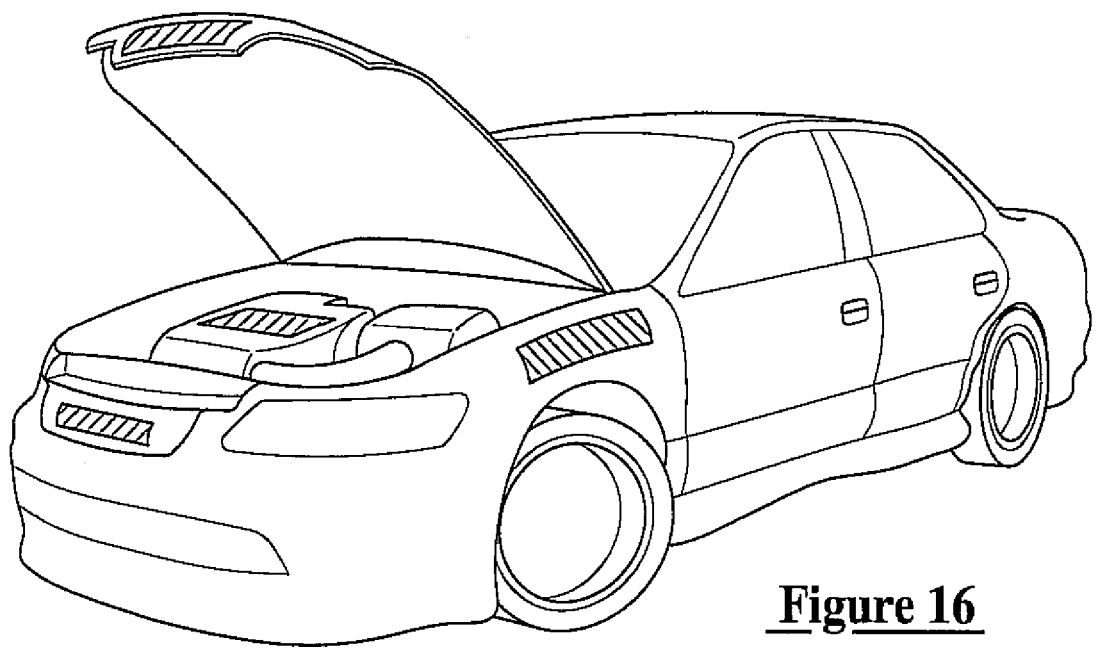
FIG. 16 depicts in the hash-marked region an inventive device provided in the context of a hood, grille, engine cover, and door.

Referring now to FIGS. 9-11, where like numerals correspond to those recently discussed with respect to FIGS. 1 and 2, an inventive vehicle light assembly is depicted generally at 80. However, the fiber optic bundle flattened portion 36 is depicted as a single row for visual clarity. The light assembly 80 is particularly well suited for the formation of a vehicle kick plate or exterior badge. A metal sill plate or badge 82 is provided that defines the bounds of an aperture 84. An element 86 bonds the plate or sill 82 and secures the same to a vehicle substrate S. Optionally, a transparent or translucent plastic insert 56 is formed with an elevated region 58 as shown in FIGS. 7 and 8 and adapted to engage the aperture 84 and placed in overlying position relative to surface 28 of device 10 or 40. The raised region 58 is formed of a transparent or translucent plastic material. Impact-resistant thermoplastics such as transparent grades of polyacrylics and polycarbonates are particularly well suited for this application. Preferably, the raised region 58, when present, is colorless. More preferably, the raised region 58 and a pedestal region 60 of the blank 56 have like optical transmission properties. A graphic 62 is optionally applied in alignment with the raised region 58 to provide different light transmissive regions within a raised region 58. The graphic 62 is applied by conventional means including the use of a stencil, an appliqué, or fusion of a colored plastic piece to the insert 56. Preferably, the graphic 62 is applied to the rearmost surface of the raised region 58 to protect the graphic 62 from abrasion and environmental exposure. A graphic 62 is readily formed with conventional visible light spectrum pigments and dyes, the pigments or dyes fluorescing under illumination provided by an inventive lighting device 10 or 40.

Optionally, the pigmented or dyed film 64 is inserted intermediate between insert 56 and the viewing surface 28 of the inventive lighting device 10 or 40. The components of the vehicle light assembly 50 are secured to a vehicle substrate S and the leads 14 and 14' are coupled to an electrical power source, as for example depicted in FIG. 4 or 5.

Figure 17:
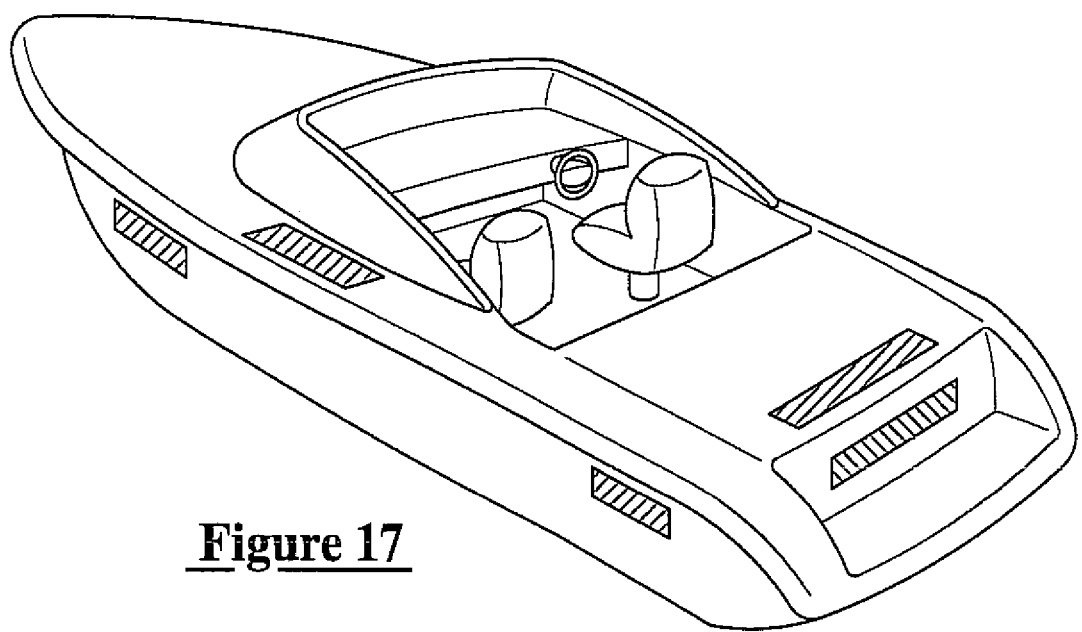
FIG. 17 depicts in the hash-marked region an inventive device provided in the context of a watercraft.
Figure 18:
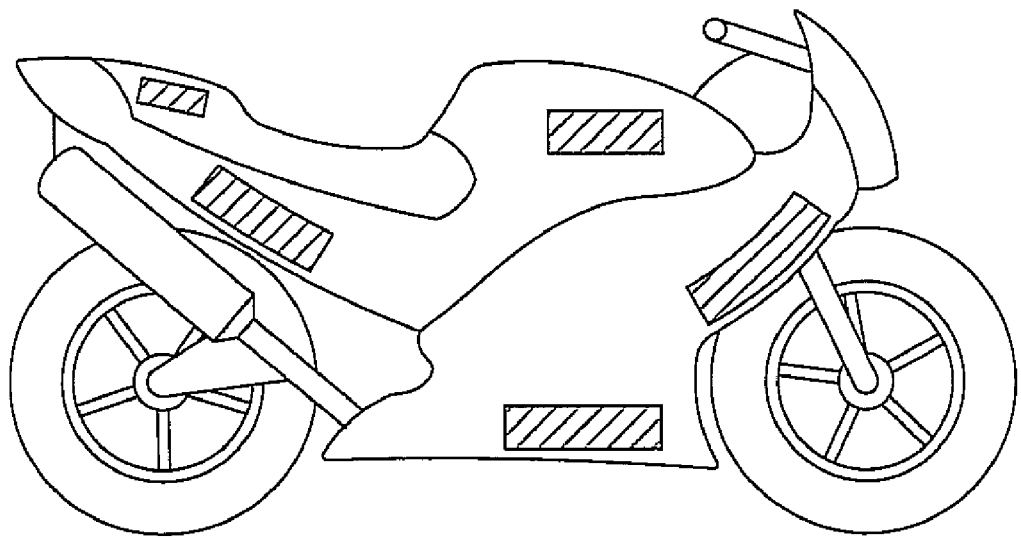
FIG. 18 depicts in the hash-marked region an inventive device provided in the context of a motorcycle.
Figure 19:
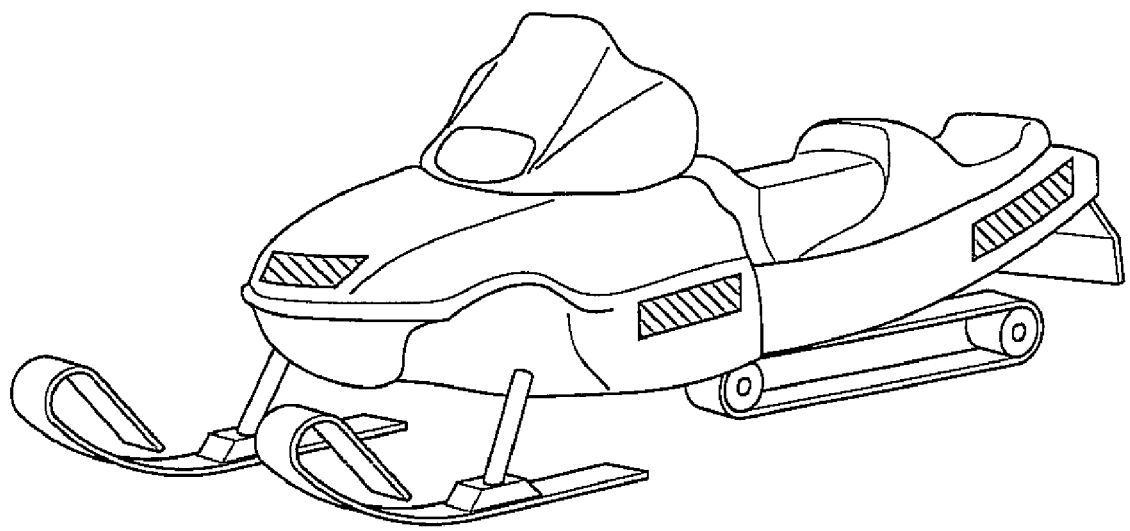
FIG. 19 depicts in the hash-marked region an inventive device provided in the context of a snowmobile.
Figure 20:
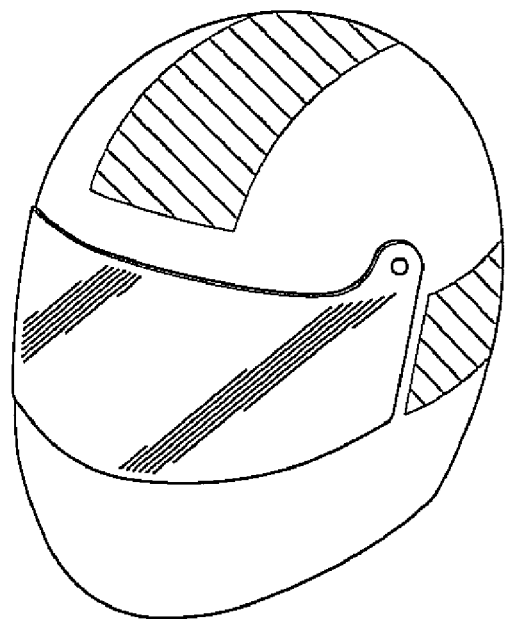
FIG. 20 depicts in the hash-marked region an inventive device provided in the context of a helmet.
Figure 21:
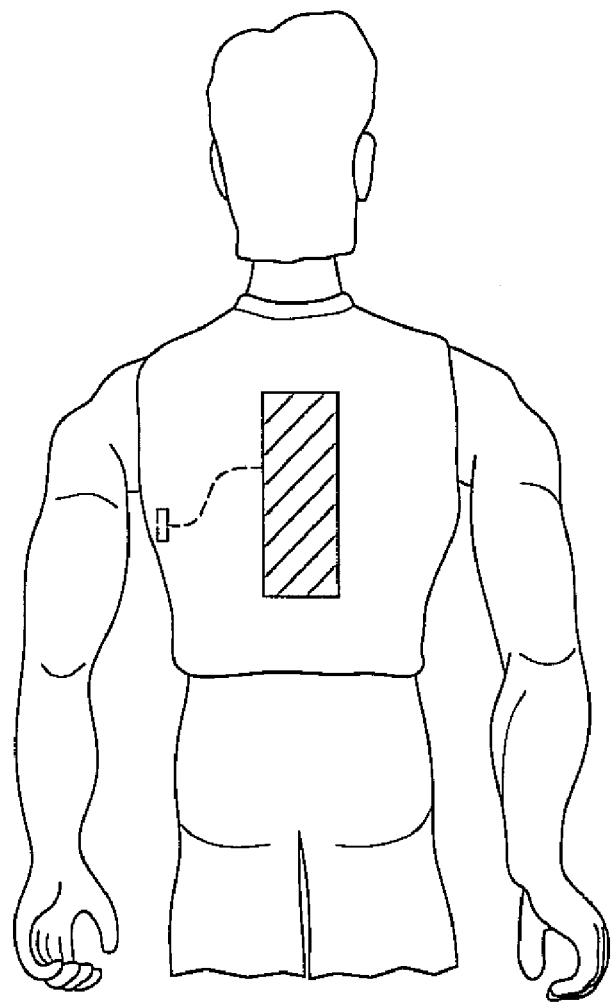
FIG. 21 depicts in the hash-marked region an inventive device provided in the context of apparel.

Exemplary placements of an inventive vehicle light assembly on a motor vehicle are depicted as the hashed region in FIGS. 12-16. The thin vertical profile of an inventive lighting device, low power consumption and the ability to protect the device from environmental degradation provide an inventive lighting assembly that is well suited for incorporation into other vehicles such as watercraft, motorcycles, and snowmobiles as shown in FIGS. 17-19. Owing to the light weight and flexible nature of a diffuser layer coated fiber array, a helmet and apparel such as that worn by motorcyclists or bicyclists also readily incorporate an inventive lighting device to provide superior visibility relative to conventional reflectors. A reflector requires an external light source to shine onto the reflector to provide visibility. If the light source is a vehicle headlight, a rider on the inside of a curve the vehicle is traversing is not visible to a vehicle driver until the avoidance distance has been reduced. In contrast, an inventive device ensures that a rider wearing a helmet or apparel is visible to a vehicle driver as soon as a line of sight is established under low ambient light conditions.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A lighting assembly comprising:
 a lighting device comprising:
   a housing;
   a light emitting diode having a light emitting portion and upon activation emitting at least one wavelength, the light emitting portion being within said housing;
   a fiber optic bundle having a proximal end receiving light from the light emitting diode and a flattened distal portion having a cross-sectional array of layers of optical fibers defining a width; and
   a diffusion layer intermediate between the flattened distal portion of said fiber optic bundle and a direction of viewing; and
 a sill plate or badge having an aperture therethrough and overlying the flattened distal portion of said fiber optic bundle: said sill plate or badge secured to a substrate on a vehicle, wherein said substrate is on a location selected from the group consisting of: an instrument panel, kick plate, tailgate, rear fascia, deck lid, window, roll bar, hood, grille, door and engine cover.

2. The assembly of claim 1 wherein the proximal end of said fiber optic bundle has a circular cross section.

3. The assembly of claim 1 further comprising a plurality of light emitting diodes deployed within said housing.

4. The assembly of claim 3 wherein said housing is elongate, said plurality of light emitting diodes are deployed in said housing, and said fiber optic bundle is flattened at the proximal end to insert in an opening in said elongate housing.

5. The assembly of claim 1 wherein the cross-sectional array is rectilinear and the layers of optical fibers are of a form selected from the group of: parallel, woven and braided.

6. The assembly of claim 1 wherein said layers of optical fibers within the distal portion of said fiber optic bundle are present from one to eight layers.

7. The assembly of claim 1 wherein said layers of optical fibers within the distal portion of said fiber optic bundles are present in a monolayer.

8. The assembly of claim 1 wherein said layers of optical fibers within the distal portion of said fiber optic bundles are present in two layers.

9. The assembly of claim 1 wherein the flattened distal portion has a surface in opposition to said diffusion layer, the surface in contact with a second layer.

10. The assembly of claim 9 wherein the second layer is a reflective layer.

11. The assembly of claim 9 wherein the second layer is a diffusing layer.

12. The assembly of claim 1 further comprising a sheath surrounding the flattened distal portion of said fiber optic bundle.

13. The assembly of claim 1 further comprising a wrapping about said fiber optic bundle adjacent to the proximal end.

14. The assembly of claim 1 further comprising an end reflector in contact with a distal end of the flattened distal portion of said fiber optic bundle.

15. The assembly of claim 1 further comprising a reflector located within said housing.

16. The assembly of claim 1 wherein the flattened distal portion has a height of between 0.3 and 3 millimeters.

17. The assembly of claim 1 further comprising a graphic overlying the lighting device.

18. The assembly of claim 17 wherein said graphic is applied to a clear plastic insert.

19. The assembly of claim 1 further comprising a colored film intermediate between said frame and the lighting device.

20. The assembly of claim 1 wherein said vehicle is a watercraft.

21. The assembly of claim 1 wherein said vehicle is a motorcycle.

22. The assembly of claim 1 wherein said vehicle is a snowmobile.

23. The assembly of claim 18 wherein said insert has a raised portion proportioned to insert within an aperture defined by said sill plate or badge.

24. The assembly of claim 1 wherein the lighting device is in electrical communication with a vehicle door switch.

25. The assembly of claim 1 wherein the lighting device is in electrical communication with a vehicle electrical harness switch selected from the group consisting of: tailgate, headlamp and tail lamp.

26. The assembly of claim 1 wherein said sill plate or badge is a metal sill plate.

27. The assembly of claim 1 wherein said sill plate or badge is an exterior badge.

* * * * *